(12) United States Patent
Albrecht et al.

(10) Patent No.: US 6,470,119 B1
(45) Date of Patent: Oct. 22, 2002

(54) DEVICE FOR COUPLING LIGHT BETWEEN TWO WAVEGUIDE END SURFACES

(75) Inventors: Helmut Albrecht, München (DE); Dieter Rosenberger, Sauerlach (DE); Gerhard Heise, München (DE); Bernhard Bayersdorfer, Baierbach (DE); Herbert Michel, München (DE); Achim Reichelt, Unterhaching (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/269,348

(22) PCT Filed: Sep. 26, 1997

(86) PCT No.: PCT/DE97/02196

§ 371 (c)(1),
(2), (4) Date: Mar. 25, 1999

(87) PCT Pub. No.: WO98/13718

PCT Pub. Date: Apr. 2, 1998

(30) Foreign Application Priority Data

Sep. 27, 1996 (DE) .......................... 196 40 002
Jul. 25, 1997 (DE) .......................... 197 32 130

(51) Int. Cl.[7] ................................. G02B 6/26
(52) U.S. Cl. ........................ 385/50; 385/16; 385/52
(58) Field of Search ................. 385/15, 16, 20–25, 385/39, 50, 52

(56) References Cited

U.S. PATENT DOCUMENTS

| | | | |
|---|---|---|---|
| 5,396,571 A | * | 3/1995 | Saadatmanash et al. ...... 385/33 |
| 5,559,906 A | | 9/1996 | Maerz |
| 5,732,171 A | | 3/1998 | Michel et al. |
| 5,793,513 A | * | 8/1998 | Fishman ..................... 359/179 |
| 5,864,643 A | * | 1/1999 | Pan ............................. 385/33 |
| 5,872,881 A | * | 2/1999 | Rossi et al. .................. 385/92 |
| 5,940,554 A | * | 8/1999 | Chang et al. ................ 385/22 |
| 6,148,639 A | * | 11/2000 | Zheng et al. ................ 65/407 |

FOREIGN PATENT DOCUMENTS

| | | | | |
|---|---|---|---|---|
| DE | 3716836 A1 | * | 12/1988 | ............ G02B/6/24 |
| EP | 0 662 621 | | 7/1995 | |
| EP | 0 711 092 | | 5/1996 | |
| JP | 57042827 A | * | 6/1982 | ............ G02B/5/14 |
| WO | WO 91/13377 | | 9/1991 | |
| WO | WO 96/00915 | | 1/1996 | |

OTHER PUBLICATIONS

Abstract of Japanese Published Application 59170815 of Sep. 27, 1984, *Patent Abstracts of Japan*, vol. 009, No. 026 (P332) Feb. 5, 1985.

McGreer, "Tunable Planar Concave Grating Demultiplexer", *IEEE Photonics Technology Letters*, vol. 8, No. 4, Apr. 1996, pp. 551–553.

Takato et al, "128–Channel Polarization–Insensitive Frequency–Selection–Switch Using High–Silica Waveguides on Si", *IEEE Photonics Technology Letters*, vol. 2, No. 6, Jun. 1990, pp. 441–443.

Clemens et al, "Flat–Field Spectrograph in $SiO_2/Si$", *IEEE Photonics Technology Letters*, vol. 4, No. 8, 1992, pp. 886–887.

* cited by examiner

*Primary Examiner*—Kenneth Parker
*Assistant Examiner*—Michael P. Mooney
(74) *Attorney, Agent, or Firm*—Schiff Hardin & Waite

(57) ABSTRACT

The coupling device comprises a displacement arrangement for displacing the two waveguide end surfaces relative to one another parallel to the end surfaces and the arrangement has an expansion element that moves the end surfaces relative to one another on the basis of a spatial expansion and/or contraction of the element. With this coupling device tunable optical multi-channel filters with temperature compensation, optical attenuators and waveguide switches can advantageously be realized in a simple manner.

11 Claims, 5 Drawing Sheets

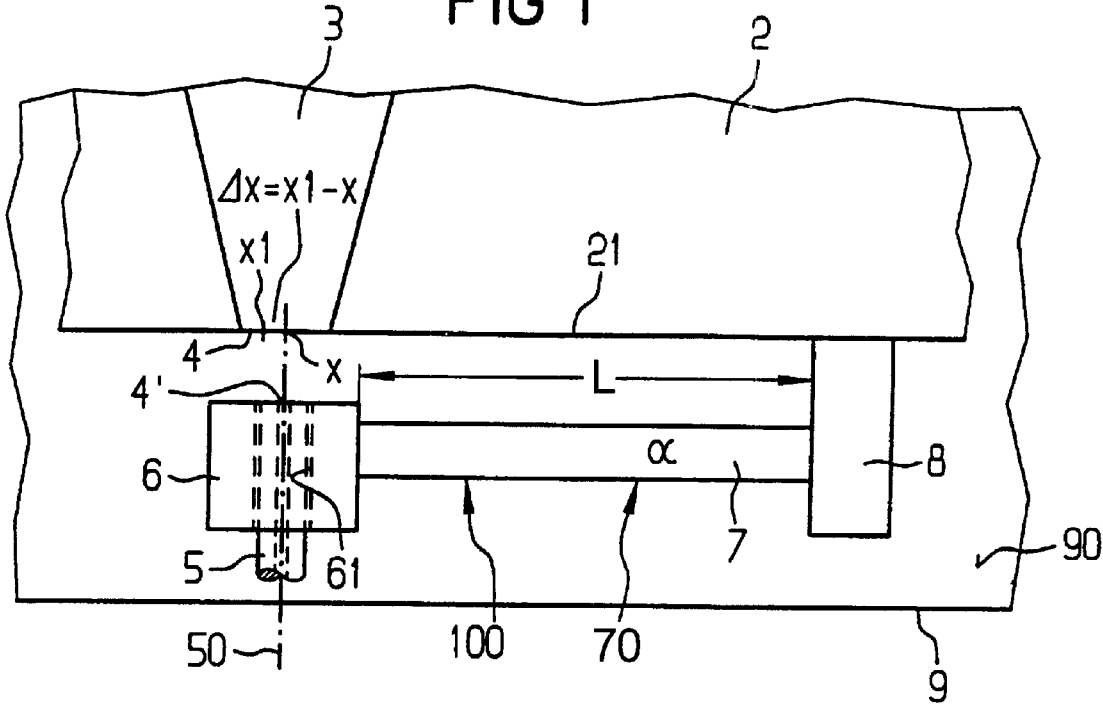
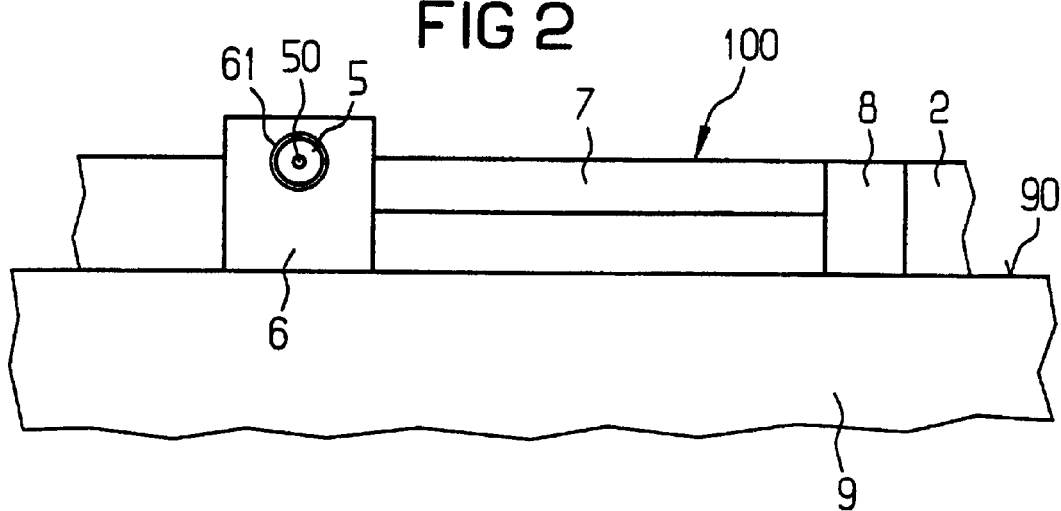

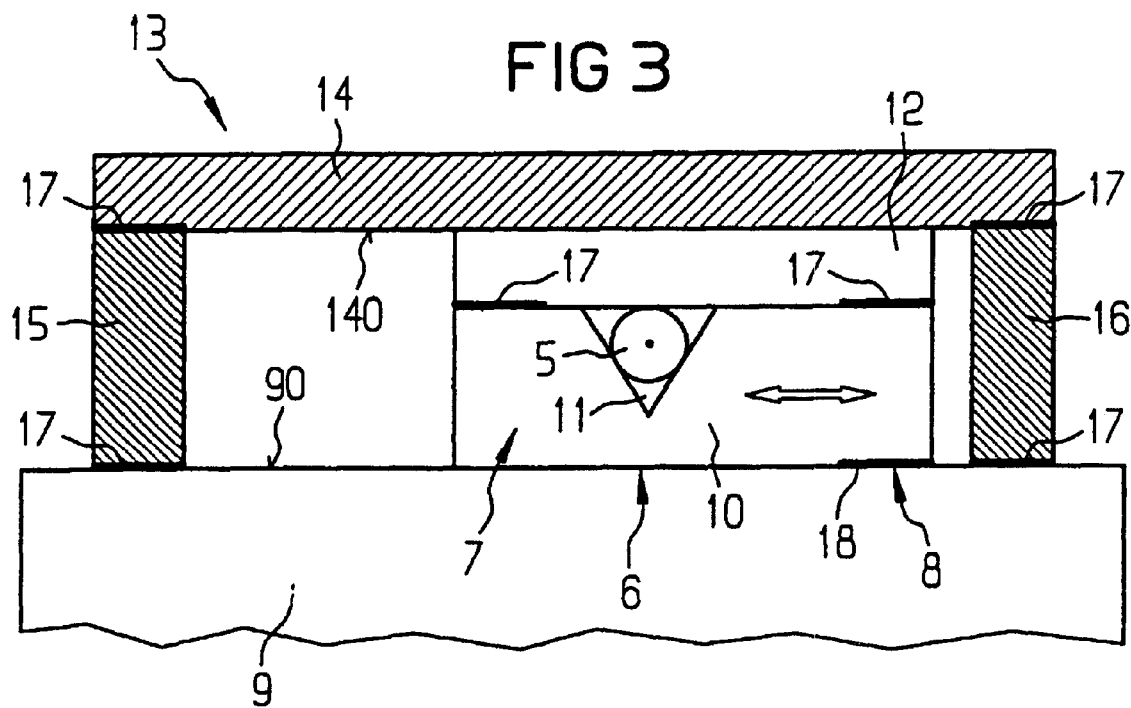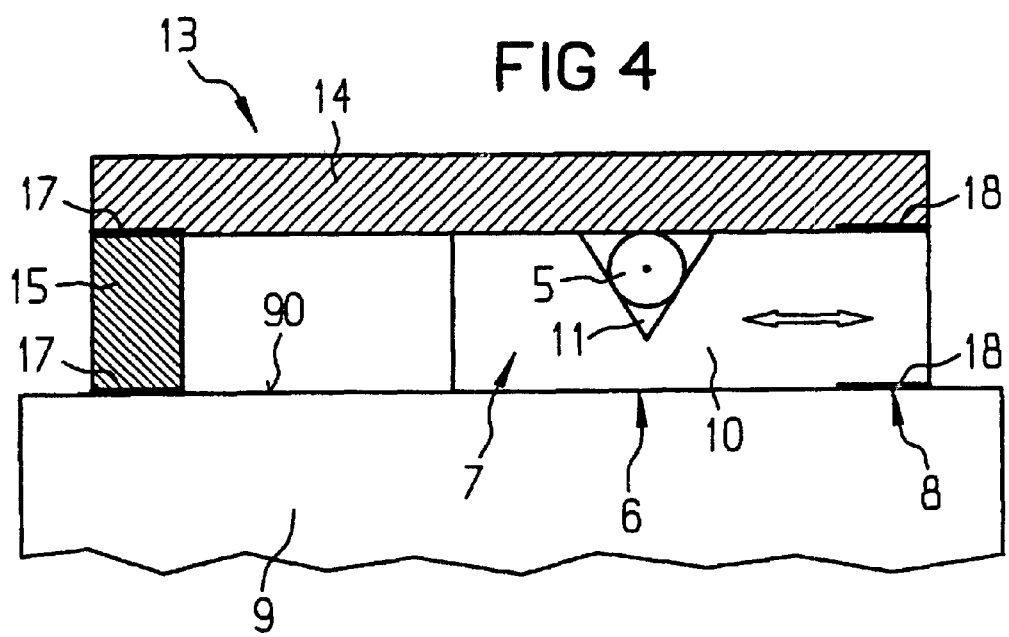

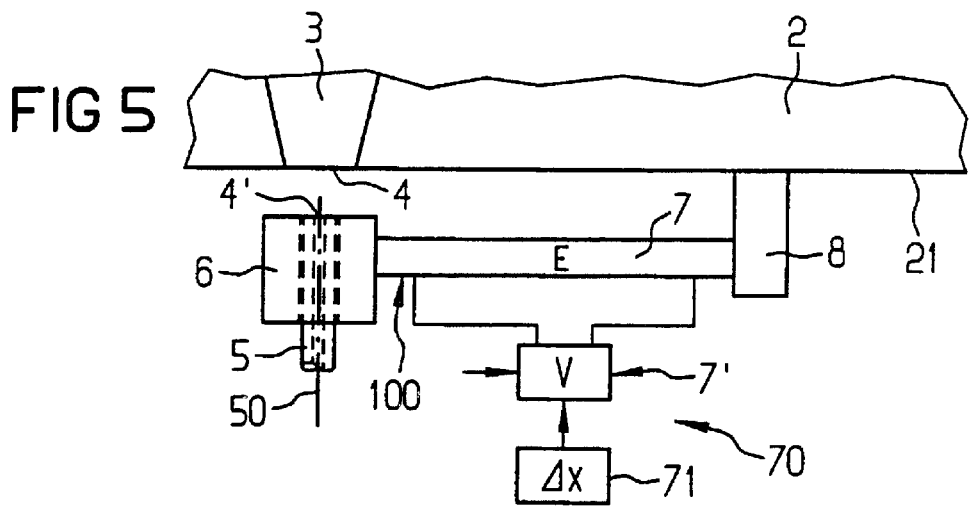
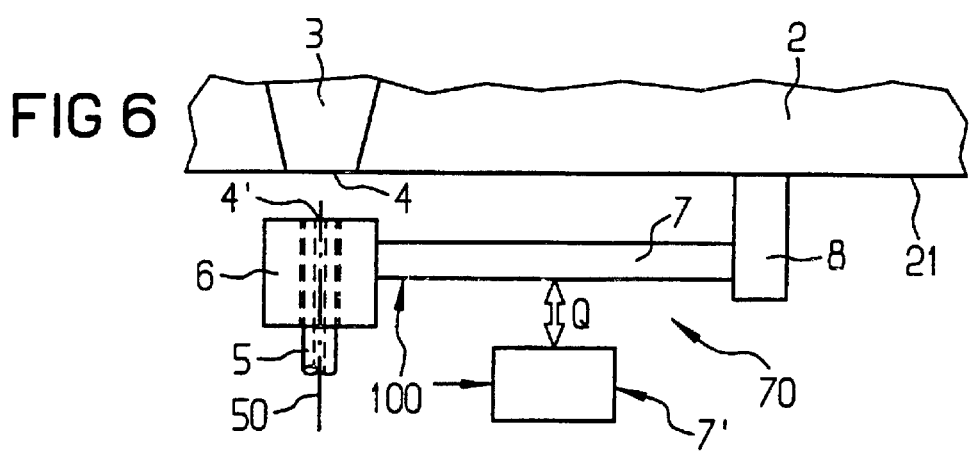
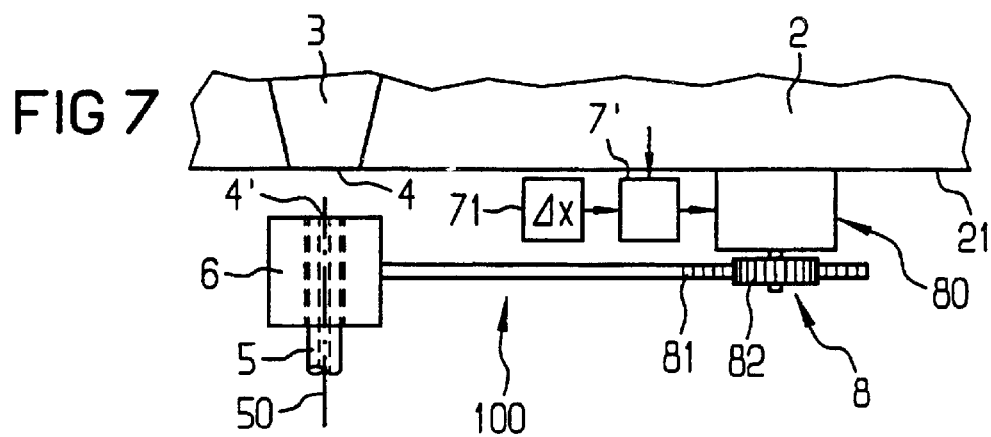

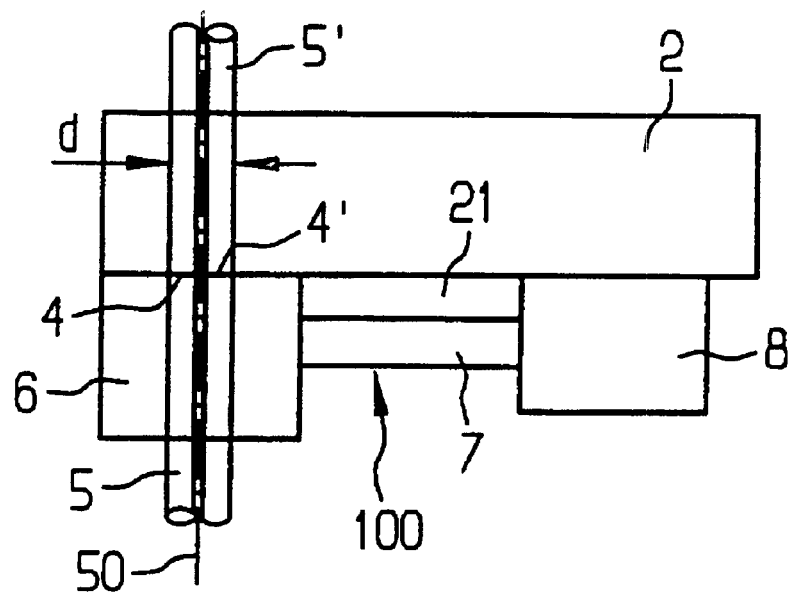
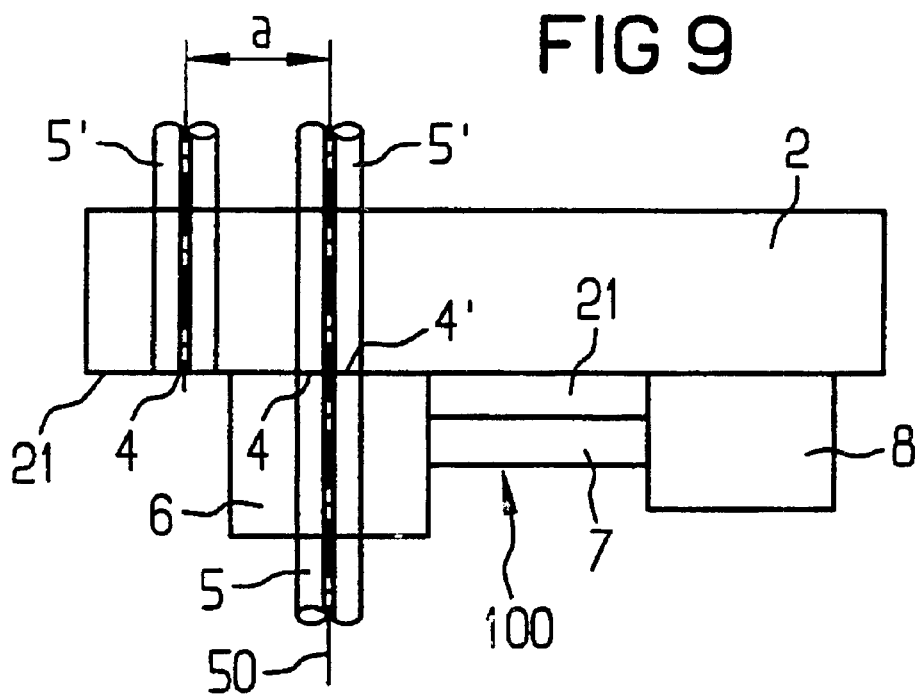

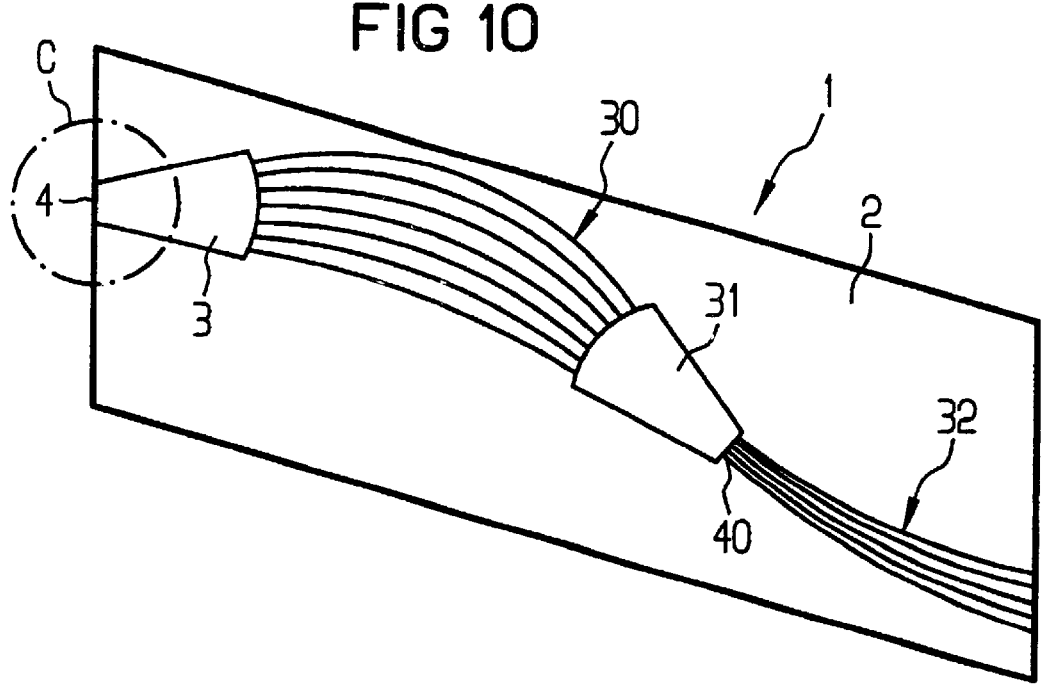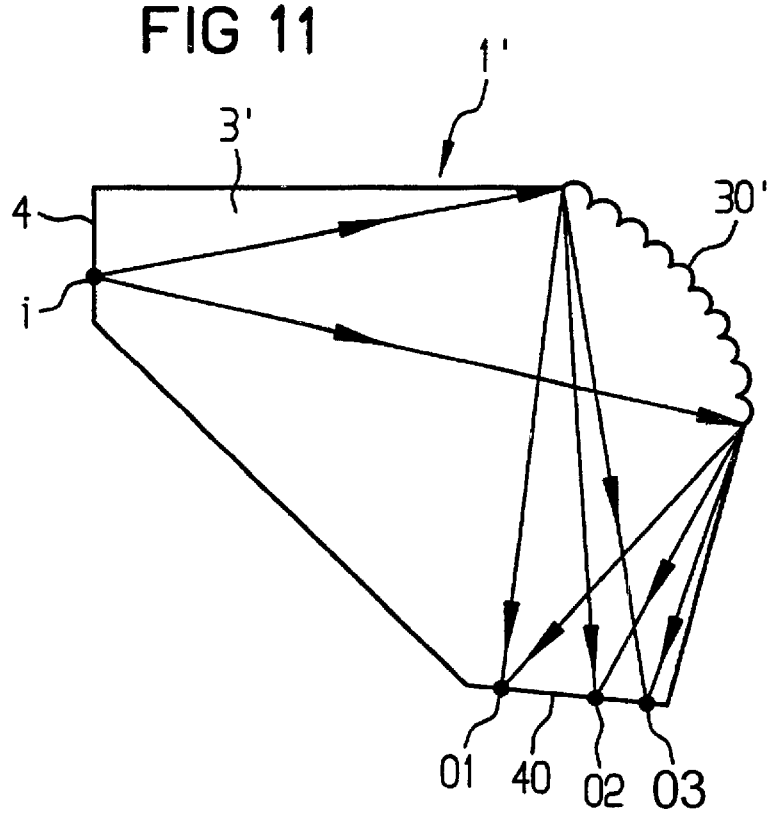

DEVICE FOR COUPLING LIGHT BETWEEN TWO WAVEGUIDE END SURFACES

BACKGROUND OF THE INVENTION

The invention relates to an optical coupling means for coupling light between two waveguide end surfaces which are arranged opposite one another.

Coupling means of the named type are used to couple light supplied in an optical waveguide into another waveguide. An example is a coupling means for coupling light supplied in a strip-type waveguide, e.g. an optical fiber, into a strip-type or layer-type waveguide that is integrated on a substrate.

For example, the integrated waveguide can be a coupling-in waveguide of an optical multi-channel filter. An example of such a filter is a filter according to the phased-array design, with a coupling-in surface in the form of an end surface of the layer-type integrated input waveguide of this filter, through which light enters into the input waveguide at a particular geometrical position, whereby the geometrical position influences an output wavelength of the optical filter.

Such optical filters according to the phased-array principle are used in particular as multiplexers or demultiplexers in optical wavelength multiplex operation (WDM), since they comprise a low insertion damping and a high cross-talk suppression.

An optical filter according to the phased-array principle comprises, as an essential component, several optical waveguides of differing optical length that are coupled to the layer-type coupling-in waveguide and that run in a curved fashion, with the waveguides forming a phase-shifter arrangement. The layer-type coupling-in waveguide distributes the light onto the waveguides of differing optical length.

In WO 96/00915 A1 (GR 94 P 1417 DE), it is specified that the center wavelength of a phased-array filter can be determined by the position of the supplying waveguide, which conducts the light into the coupling-in waveguide of the filter. In this way, the center wavelength of this filter can be adjusted precisely by means of the geometrical positioning of the end surface of the supplying strip-type waveguide in relation to the end surface of the coupling-in waveguide of the filter.

After the adjustment of the center wavelength, the end surface of the supplying waveguide and the end surface of the coupling-in waveguide of the filter are fixed relative to one another, e.g. in that the supplying waveguide is glued fixedly to the substrate of the filter.

Given a conventional manner of construction of such a filter, the center wavelength and channel spacing are determined by the layout of the filter and by the process technology.

With respect to many applications, there is a need for a filter that can be tuned or matched. With such a filter, it is purposely possible to select one of several channels, or the center wavelength of a filter comb can be matched to the requirements of operation, in order for example to compensate for the ageing of transmitting lasers.

Apart from classical monochromators, piezo-controlled Fabry-Perot resonators are predominantly offered on the market as tunable or matchable optical filters. These are manufactured in a micromechanical construction, and are for this reason expensive and not suitable for mass production and application.

Mach-Zehnder interferometers can be tuned (see N. Nakato et al.: "128-Channel Polarisation-Intensive Frequency-Selection Switch using High-Silica Waveguides on Si," IEEE Photonics Technology Letters 2, p. 441 (1990)), but are periodic filters. For narrow-band applications, a cascading of several such filters, matched to one another, is thus necessary. The matching of a filter constructed in this way thereby becomes very expensive, because for this purpose a corresponding number of control currents must be regulated.

Phased-array filters can in principle be tuned by modifying the optical path length in the individual waveguides of the phase-shifter region of this filter, e.g. by means of thermo-optical and/or electro-optical effects (see EP 0 662 621 A1 (GR 94 P 1013 DE)).

SUMMARY OF THE INVENTION

The invention is based on the object of providing optical multichannel filters, easily tuned, with a strip-type or layer-type coupling-in waveguide comprising an end surface, in particular phased-array filters.

Advantageously, with the inventive coupling means it is possible to adapt a particular output wavelength of the filter, e.g. the center wavelength of a filter comb, to the requirements of the operation, in order for example to compensate for the modification of the transmitting lasers.

A particular advantage of the invention is that not only such tunable optical multi-channel filters, including multi-channel filters according to the spectrograph principle, but rather also optical intensity modulators and waveguide switches, can be realized.

The shifting means of the inventive coupling means can advantageously be realized in miniaturized form, i.e. with dimensions that are on the order of magnitude of the dimensions of the waveguide end surfaces.

The inventive coupling means advantageously comprises a compact construction, and thus has sufficient stability to ensure that the adjustment of a strip-type waveguide is maintained in relation to the position of another waveguide, in particular of a layer-type waveguide, and no worsening of the insertion damping thereby takes place.

The inventive shift means is preferably and advantageously constructed in such a way that, relative to a support point that is fixed relative to one of the two end surfaces, the expansion element expands and/or contracts in a direction parallel to the one end surface, and thereby moves the other end surface relative to the fixed support point. A fixed reference point is thereby given to which the expansion and/or contraction are oriented. The end surface that is moved relative to the fixed support point can be the end surface of a waveguide in which the light is supplied to the coupling means, and/or the end surface of a waveguide in which the light is conducted away from the coupling means.

The other end surface is advantageously mounted in a mounting element that can be moved parallel to the one end surface, which element is connected fixedly with the expansion element. It is thereby advantageous for the mounting element and the expansion element to be constructed in one piece, since in this way the assembly expense is reduced.

Preferably and advantageously, the mounting element is made of a ceramic material, and comprises a continuous opening in which a waveguide comprising the other end surface is housed and fixed.

In order to prevent the mounting element from being able to oscillate about the support point with the expansion element, it is advantageous to provide a guide means for the linear guiding of the mounting element parallel to the one end surface. Such a guide means preferably comprises two glide surfaces positioned opposite one another and arranged fixedly relative to an end surface, between which the mounting element is arranged and along which the mounting element can be moved parallel to the one end surface.

In a preferred and advantageous embodiment of the inventive coupling means, the displacement means can be controlled externally. For this purpose, this embodiment is advantageously constructed in such a way that the displacement means comprises a control means with which the expansion and/or contraction of the expansion element can be controlled.

The coupling means that can be controlled in this way is preferably fashioned in such a way that the expansion element is made of piezoelectric material and the control means produces an electrical field that acts on the piezoelectric material with a field strength that can be modified in a controllable fashion, and/or in such a way that the expansion element is made of material with a thermal expansion coefficient, and the control means comprises a means for the controlled heating and/or cooling of the expansion element.

In a further preferred embodiment of a controllable coupling means, the displacement means comprises a positioning motor that is fixed relative to the one end surface, and comprises an expansion element in the form of a final controlling element that is connected with the other end surface and that can be displaced by the positioning motor, and the control means controls the positioning motor.

In a preferred and advantageous construction of an inventive coupling means, the displacement means comprises a compensation means for the compensation of a position spacing between a relative actual position that the two end surfaces assume relative to one another and a relative target position that the two end surfaces are supposed to assume relative to one another.

This construction advantageously enables an automatic correction of the relative position that the two end surfaces assume relative to one another to a new relative position, the target position, when this is required by circumstances.

If a compensation means for compensation of the particular spacing between a relative actual position and a relative target position is provided, and the difference in position between the relative actual position and the relative target position is essentially proportional to a temperature difference prevailing in the environment of the coupling means, this coupling means can advantageously be constructed in such a way that the compensation means consists of an expansion element made of material with a thermal coefficient of expansion, and that the thermal coefficient of expansion and a dimension of the expansion element are selected parallel to an end surface relative to one another in such a way that a thermal expansion and/or contraction of the expansion element, caused by the temperature difference, essentially compensates the difference in position.

Such relations are for example present, as indicated already, in an optical filter according to the phased-array principle in relation to an output wavelength of this filter, whose position is temperature-dependent.

An advantageous compensation means that can compensate not only temperature-caused positional differences but also positional differences caused in other ways, e.g. caused by wavelength modifications, is fashioned in such a way that it comprises an expansion coefficient made of piezoelectric material, a means for determining the positional spacing between the relative actual position and the relative target position, and a control means for producing an electrical field strength that acts on the piezoelectric material and that is proportional to the determined positional difference in such a way that the piezoelectrical expansion and/or contraction of the expansion element produced by this field strength essentially compensates the positional difference.

Another advantageous compensation means is constructed in such a way that the compensation means comprises a positioning motor that is fixed relative to the one end surface and an expansion element in the form of a final positioning element that is connected with the other end surface and can be moved by the positioning motor, a means for determining the positional difference between the relative actual position and the relative target position, and a control means for controlling the positioning motor dependent on the determined positional difference in such a way that the positioning motor essentially compensates the positional difference. This embodiment can also compensate not only temperature-caused positional differences but also positional differences caused in other ways, e.g. caused by wavelength modifications. In a particularly preferred embodiment of an inventive coupling means, one of the two end surfaces is an end surface of a waveguide of an optical wavelength filter that serves for the coupling of light into or out of the filter, whereby a tunable multichannel filter is realized.

In a concrete embodiment of such a filter, the wavelength filter consists of a filter according to the phased array principle, in which the position of the center wavelength or of other output wavelengths is temperature-dependent.

For example, in a phased-array filter in the InGaAsP material system, the temperature dependence of the transmission curves of approx. 0.01 nm/K in the $SiO_2$ material system and approx. 0.1 nm/K has up to now been an obstacle to a successful use of the system. In use, temperature differences of more than 100 K can occur in these optical filters, whereby problems occur given channel spacings of only a few nanometers.

With the coupling means, an optical fiber according to the phased-array principle can be realized that comprises a coupling-in surface into which light enters at a particular position, whereby the geometrical position influences an output wavelength or, respectively, center wavelength of the filter, in which the temperature sensitivity of the filter can be compensated in a particularly reliable and simple manner.

Up to now, an active temperature regulation has been carried out for the solution of this problem, and a uniform temperature has been produced in the filter region. For this purpose, however, an additional specification and monitoring expense is required.

In principle, it is also possible to manufacture filters from glasses having a low temperature coefficient. However, these require a considerable development expense.

On the basis of the coupling means, in of the invention, a means for coupling light in, which means can be subsequently moved parallel to the coupling-in surface of the filter, and a temperature-sensitive element are present. The movable means is connected with the temperature-sensitive element in such a way that the geometrical position on the coupling-in surface at which the light enters into the optical filter can be moved dependent on the temperature.

In this way, in the phased-array filter a reliable temperature compensation can be produced by means of a simple mechanical displacement of a position for coupling light in, without requiring an expensive cooling apparatus or heating means.

In the coupling means of the invention, the temperature-sensitive element and the displaceable means advantageously consist essentially only of the compensator, whose displacement is due to a thermal length expansion. By this means, both functions are perceived by only one element, which in addition operates passively and requires no monitoring at all.

It is thereby advantageous to design the dimension, e.g. length, and material of the compensator dependent on the temperature coefficient of the optical filter. This is possible in principle because both the temperature coefficient of a phased-array filter and also the dispersion exhibit linear dependencies. The likewise linear expansion of the compensator can thus be adapted precisely to the optical filter by the selection of the material and/or of the dimension of the compensator in the direction of the expansion.

The compensator is advantageously fastened mechanically to the optical filter so that a fixed reference point is given to which the displacement can be oriented. The displaceable means for coupling light in preferably comprises a coupling-in fiber with a mount. The compensator and the mount for the coupling-in fiber are preferably fashioned in one piece from a suitable material, since by this means the assembly expense is reduced.

In order to prevent the coupling-in fiber from oscillating about the fastening point with the compensator, it is advantageous to provide a mechanical guide for the compensator and the mount for the coupling-in fiber. Such a mechanical guide preferably comprises a covering plate and one or two supports that are made of materials with adapted expansion coefficients. The compensator and the mount fastened thereto with the coupling-in fiber are then displaced in a defined fashion in one direction, guided by the cover plate and a base plate.

On the basis of the coupling means according to the invention, another preferred embodiment of the filter is realized in which the temperature-sensitive element comprises a temperature sensor with an electrical output and the displaceable means comprises an electrically controllable stepped motor. Likewise, the displaceable means can comprise a piezocrystal. By means of such an arrangement, dependent on the temperature a coupling-in fiber can likewise be displaced in defined fashion on the coupling-in surface, so that the temperature dependence of the optical filter is compensated.

The coupling means according to the invention is not limited to filters according to the phased-array principle. The optical filter in which the inventive coupling means can be applied can be for example an integrated optical multichannel filter according to the spectrograph principle.

In such a filter, the light conducted in a layer waveguide is bent at a reflection grid inserted into the waveguide, and is simultaneously imaged from a coupling-in point to a coupling-out point whose position is wavelength-dependent. If the coupling-in point is displaced in relation to a coupling-in end surface, the position of the coupling-out points wanders corresponding to the optical imaging, so that here as well, similar to the filter according to the phased-array principle, a fine tuning of the wavelength channels is possible via the position.

If the integrated optical filter according to the spectrograph principle is for example designed according to what is called the flat field principle, coupling-out waveguides can also be moved in principle for the tuning. In this case, an inventive coupling means is to be arranged opposite a coupling-out end surface of the waveguide, from which light is coupled out from the filter.

The possibility of tuning grid spectrographs by the displacement of coupling-in and coupling-out waveguides was published in K. A. McGreer: "Tunable Planar Concave Grating Demultiplexer", IEEE Photonics Technology Letters 8, page 551 (1996), but this possibility is based on a different principle than the inventive coupling means.

The inventive coupling means is not limited to optical filters, but rather can in principle be applied in all optical means in which waveguide end surfaces of two or more optical waveguides are positioned opposite one another for the coupling-in and/or coupling-out of light between these waveguides, and in which a relative displacement between the end surfaces parallel to an end surface is desired or necessary.

A preferred embodiment of such a coupling means is fashioned in such a way that the end surfaces positioned opposite one another are strip-type optical waveguides comprising essentially the same cross-section. The strip-type waveguides can be optical fibers and/or integrated strip-type waveguides whose cross-section is not elongated, in distinction from layer waveguides, but rather comprises essentially equal height and width.

With such a coupling means, in connection with a control means according to the invention, an adjustable optical attenuator can be realized in which the coupling attenuation between two strip-type waveguides whose end surfaces are positioned opposite one another increases in a controlled fashion with an increasing lateral displacement of the two end surfaces relative to one another.

With such a coupling means, a waveguide switch can also advantageously be realized whose manner of operation is analogous to that of the attenuator. A preferred embodiment for this purpose is fashioned in such a way that end surfaces, arranged next to one another, of two or more other strip-type waveguides are arranged opposite the end surface of a strip-type waveguide, and the displacement means is fashioned in such a way that the end surface of the one strip-type waveguide and the end surfaces of the other strip-type waveguides can be displaced relative to one another by at least a distance between adjacent end surfaces of the other strip-type waveguides. By means of this measure, it is selectively possible to bring the end surface of the one strip-type waveguide into a position opposite the end surface of another strip-type waveguide or the end surface of another different strip-type waveguide. The displacement means need only be dimensioned in such a way that in the relative displacement of the end surfaces at least the spacing of two adjacent end surfaces of the other strip-type waveguides can be bridged over.

BRIEF DESCRIPTION OF THE DRAWINGS

FIG. 1 shows a top view of a first embodiment of the inventive coupling means;

FIG. 2 shows a side view of the embodiment according to FIG. 1;

FIG. 3 shows an embodiment of a mechanical guide for the inventive coupling means;

FIG. 4 shows a further embodiment of a mechanical guide for the inventive coupling means.

FIG. 5 shows a top view of a second embodiment of the inventive coupling means;

FIG. 6 shows a top view of a third embodiment of the inventive coupling means;

FIG. 7 shows a top view of a fourth embodiment of the inventive coupling means;

FIG. 8 shows a top view of an example of an optical attenuator realized with an inventive coupling means;

FIG. 9 shows a top view of an example of a waveguide switch realized with an inventive coupling means;

FIG. 10 shows a top view of an optical filter according to the phased-array principle, in which the first embodiment of the inventive coupling means is applied; and FIG. 11 shows a top view of an optical filter according to the spectrograph principle in which an inventive coupling means can be applied.

DESCRIPTION OF THE PREFERRED EMBODIMENTS

In the inventive optical coupling means shown in the figures, the two waveguide end surfaces which, are arranged opposite one another for the coupling of light between the two end surfaces are designated 4 and 4', and the displacement means for displacing the two end surfaces 4 and 4' relative to one another parallel to an end surface 4 and/or 4' is designated 100.

In the embodiments shown in FIGS. 1 and 2 and FIGS. 5 to 7, for example the end surface 4 is an end surface of a layer waveguide 3 fashioned on a substrate 2, and the other end surface 4' is an end surface of a strip-type waveguide 5 in the form of an optical fiber, for example a core-cladding fiber. In the embodiments according to FIG. 8 and FIG. 9, the end surface 4 is an end surface of a strip-type waveguide 5', for example likewise an optical fiber.

The displacement means 100 comprises an expansion element that moves the end surfaces 4 and 4' relative to one another on the basis of a spatial expansion and/or contraction of the element, and is designated 7 in all embodiments, with the exception of the embodiment according to FIG. 7. In the embodiment according to FIG. 7, the expansion element is designated 81.

In all embodiments, for example the end surface 4' of the strip-type waveguide 5 can be moved relative to the fixed end surface 4 of the other waveguide 3 or 5', whereby in the embodiments with the expansion element 7, this element 7 is supported on a support point 8 that is fixed relative to the fixed end surface 4, and the moveable end surface 4' can be moved by means of an expansion and/or contraction, parallel to the fixed end surface 4, of the expansion element 7 relative to the fixed support point 8 and thus to the end surface 4.

The moveable end surface 4' is mounted, with the strip-type waveguide 5, in a mounting element 6 that can be moved parallel to the fixed end surface 4, which mounting element 6 is connected fixedly with the expansion element 7, whereby the mounting element 6 and the expansion element 7 can be fashioned in one piece.

The mounting element 6 can for example (see FIGS. 3 and 4) comprise a lower part 10 having a slot 11 in which the strip-type waveguide 5 is completely housed, and whose upper side is covered by an upper part 12 or 14, whereby the upper part 12 or 14 and lower part 10 can be glued or soldered to one another.

In a preferred embodiment, the mounting element 6 is of one piece and comprises a continuous opening 61 (FIGS. 1 and 2), in which the strip-type waveguide 5 comprising the moveable end surface 4' is housed and fixed. The one-piece mounting element 6 is preferably made of ceramic material.

In order to avoid oscillations, the mounting element 6 is guided in linear fashion parallel to the fixed end surface 4 by means of a guide means.

In FIGS. 3 and 4, two embodiments of such a guide means are shown, designated 13 in these figures.

In both embodiments, the guide means 13 comprises two glide surfaces 90 and 140 that are positioned opposite one another and are arranged fixedly relative to the fixed end surface 4, between which glide surfaces the mounting element 6 is arranged and along which the mounting element 6 can be displaced parallel to the fixed end surface 4.

One glide surface is for example the surface 90 of a base plate 9 on which surface 90 the substrate 2 is arranged and relative to which the fixed end surface 4 stands at an angle of for example approximately 90°, and the other glide surface is for example a surface 140 of a cover plate 14 facing the surface 90, held at a distance from the base plate 9 by means of supports 15 and 16. The supports 15 and 16 are glued or soldered to the covering plate 14 and the base plate 9 at connection points 17.

In both embodiments, the expansion element 7 is connected fixedly with the surface 90 at a connection point 18 located at a distance from the mounting element 6, for example by means of gluing or soldering. This connection point 18 defines a fixed support point 8 at which the expansion element 7 is fixedly supported and relative to which the mounting element 6 can be moved relative to the support point 8 by means of an expansion and/or contraction of the expansion element 7 parallel to the fixed end surface 4.

In the embodiment according to FIG. 3, the expansion element 7 is connected fixedly only with the surface 90 and not with the surface 140. The mounting element 6 consists of the lower part 10, which glides on the surface 90, having a slot 11 for the reception of the strip-type waveguide 5, and the upper part 12, which glides on the surface 140, and here the lower part 10 and the expansion element 7 are made of one piece of a suitable material, in order to reduce assembly expense. The cover plate 14 and the supports 15 and 16 are made of materials whose thermal coefficient of expansion are adapted in relation to the expansion element 7.

In the embodiment according to FIG. 4, the mounting element 6 is of one piece, and consists only of an underpart 10 with a slot 11 for receiving the strip-type waveguide 5, which glides both on the surface 90 and also on the surface 140 of the cover plate 14. In addition, only one support 15 is provided, and the function of the second support is taken over by the expansion element 7, which is not only connected fixedly with the surface 90 at a connection point 18, but is also connected fixedly with the surface 140 of the cover plate 14 at a connection point 18 located opposite this connection point 18, e.g., by means of gluing or soldering. The two connection points 18 together define a fixed support point 8 on which the expansion element 7 is fixedly supported and relative to which the mounting element 6 can be moved by means of an expansion or contraction, parallel to the fixed end surface 4, of the expansion element 7 relative to the support point 8. The embodiment according to FIG. 4 is thus further simplified in relation to that according to FIG. 3.

In FIGS. 1 and 2, a first embodiment of an inventive optical coupling means is shown in which a layer waveguide 3 with the end surface 4 is fashioned on a substrate 2, which end surface is located immediately at one edge 21 of the substrate 2. Immediately adjacent to the coupling-in surface 4, an optical fiber 5 is arranged with the end surface 4', located opposite the end surface 4.

The fiber 5 is mounted in the mounting element 6, which can be displaced parallel to the end surface 4 of the layer waveguide 3 and thus also to the edge 21 of the substrate 2.

The mounting element 6 is manufactured in one piece from ceramic material, and comprises a continuous hole 61 in which the fiber 5 is housed and fixed. It is fastened to the expansion element 7, which is in turn is fixed via the support point 8 relative to the substrate 2. Here the support point 8 is for example defined by a support element that is connected fixedly with the substrate 2 and/or the base plate 9, and on which the expansion element 7 is supported.

The expansion element 7 is made of material with a thermal expansion coefficient α, and a change of temperature ΔT causes a thermal expansion and/or contraction of the expansion element 7 parallel to the edge 21 of the substrate and thus to the end surface 4. Corresponding to this expansion and/or contraction, the mounting element 6, and with it the end surface 4', are displaced forward or back parallel to the end surface 4.

In the embodiment according to FIGS. 1 and 2, the layer waveguide 3 is specifically a coupling-in waveguide of an optical filter 1 according to the phased-array principle, shown in FIG. 10. Light is coupled into the waveguide 3 through the end surface 4 of this coupling-in waveguide 3, and is conducted in the waveguide 3 to a phase shifter arrangement 30. The light exiting from the phase shifter arrangement 30 is coupled into an output waveguide 31, which has the form of a layer waveguide the light of the filter 1, and in this output waveguide is supplied to an end surface 40 of this waveguide 31, from which this light can be coupled out. A separate geometrical position in the end surface 40 of the coupling-out waveguide 31 can thereby be allocated to each wavelength or, respectively, each wavelength channel of the light coupled into the filter 1, and is also allocated to a center wavelength of the filter 1 about which the remaining wavelengths are grouped.

The position of the center wavelength, and with it the positions of the other wavelengths in the end surface 40 of the coupling-out waveguide 31, depend on the one hand on the geometrical position in which the center wavelength is coupled into the end surface 4 of the coupling-in waveguide 3 into the filter 1, and on the other hand on the temperature T of the filter 1, i.e., given a position maintained in the end surface 4 of the coupling-in waveguide 3, given a change of temperature ΔT of the filter 1 the position of the center wavelength changes in the end surface 40 of the coupling-out waveguide 31.

The inventive coupling means now advantageously enables the realization of a tunable filter 1 according to the phased-array principle, for example insofar as a) the light to be coupled into the filter 1 is supplied through the strip-type waveguide 5, and is supplied from the end surface 4' of this waveguide 5 to the end surface 4 of the coupling-in waveguide 3 of the filter 1, and is coupled into the filter 1 through this end surface 4, and b) the end surface 4' of the strip-type waveguide 5 is purposely displaced relative to the end surface 4 of the coupling-in waveguide 3 in such a way that the center wavelength impinges on this end surface 4 in a position to which a desired position of the center wavelength λ in the end surface 40 of the coupling-out waveguide 31 of the filter 1 is allocated, and/or c) given a change of temperature ΔT of the filter 1, the end surface 4' of the strip-type waveguide 5 is displaced relative to the end surface 4 of the coupling-in waveguide 3 in such a way that after the change of temperature ΔT the center wavelength now impinges on this end surface 4 in a position to which the original position of the center wavelength before the temperature change ΔT is allocated, whereby the change of position, caused by the temperature change ΔT, of the center wavelength in the end surface 40 of the output waveguide 31 of the filter 1 is compensated.

That which has been specified for the center wavelength holds in the same way for each of the other wavelengths.

FIG. 1 represents the region of the tunable filter 1 according to FIG. 10 within the circle C in enlarged fashion.

As a position in which a wavelength to be coupled into the filter 1 impinges on the end surface 4, the point x can be taken, at which the axis of the light beam exiting from the end surface 4' and to be coupled in through the end surface 4 strikes the end surface 4. For the sake of simplicity, in the examples shown it is assumed that this axis coincides with the axis 50 of the strip-type waveguide 5.

Accordingly, by the relative position x, i.e., by the geometrical position x which the two end surfaces 4 and 4' assume relative to one another, the point x is to be understood at which the axis of the light beam exiting from one of the two end surfaces impinges on the other end surface.

By relative actual position, the relative position actually assumed is to be understood, and by relative target position the relative position is to be understood that is supposed to be assumed or is desired.

In the example according to FIGS. 1 and 2, the displacement means 100 comprises a compensation means 70 for the compensation of a positional spacing Δx between a relative actual position x and a relative target position x1 that is to be assumed.

This compensation means 70 consists of an expansion element 7 made of a material with a thermal expansion coefficient α, and the thermal expansion coefficient α and the dimension L of the expansion element 7 in the direction parallel to the edge 21 of the substrate 2 are selected such that a thermal expansion and/or contraction, caused by the change of temperature ΔT, of the expansion element 7 parallel to the edge 21 of the substrate 2 essentially compensates the position spacing Δx. This thermal expansion and/or contraction of the expansion element 7 automatically displaces the mounting element 6, and thereby the end surface 4', relative to the support point 8, and thereby to the end surface 4, dependent on the temperature T, parallel to the edge 21 of the substrate 2 in such a way that the position of the center wavelength in the end surface 40 of the coupling-out waveguide 31 of the filter 1 is maintained and is independent of the temperature T.

In addition, the temperature coefficient of the filter can for example be matched to that of laser diodes by means of the selection of a different compensator.

The selection possibilities of the dimension L and of the material of the expansion element 7 are illustrated with the following example.

An exemplary temperature coefficient of a phased-array filter in $SiO_2$—Si technique is:

$$\Theta_{PA} = \frac{d\lambda}{dT} = 0.01 \frac{nm}{K}$$

The dispersion of such a phased array is then for example $$D = \frac{d}{dx} = \frac{3.2 \text{ nm}}{20 \text{ } \mu m} = 0.16 \text{ nm}/\mu m$$

The temperature dependence predetermined in this way of the phased-array filter must be compensated by means of the expansion and/or contraction of the expansion element 7 in the direction parallel to the edge 21 of the substrate 2, which is calculated according to the equation $$\Delta x = \alpha \cdot L \cdot \Delta T$$

$\alpha = (\alpha_s - \alpha_k)$ is thereby the difference between the expansion and/or contraction of the substrate 2, i.e., that of silicon ($\alpha_s = 2.33 \cdot 10^{-6}$ 1/K) and the material $\alpha_k$ of the expansion element 7 in the direction parallel to the edge 21 of the substrate 2. From this there results the requirement:

$$\alpha \cdot L = \Theta_{PA} / D \approx 0.0625 \, \mu m/K$$

If for example BK7 glass with $\alpha_k = 7.1 \cdot 10^{-6}$ 1/K is taken for the expansion element 7, there results a dimension L of 13.1 mm in the direction parallel to the edge 21. Given the use of materials with higher expansion coefficients, this dimension L is correspondingly shortened. For aluminum, $\alpha_k = 25 \cdot 10^{-6}$/K, so that this dimension L need be only 2.7 mm.

FIG. 2, which shows the coupling means according to FIG. 1 in a side view with the direction of view towards the edge 21 of the substrate 2, shows that the substrate 2, in which are arranged the coupling-in waveguide 3, the phase shifter arrangement 30, the coupling-out waveguide 31, and an arrangement 32 of strip-type waveguides arranged at the coupling-out-side end surface 40 of the coupling-out waveguide 31, is arranged on the base plate 9. The element forming the fixed support point 8 is fastened on the substrate 2 and/or on the surface 90 of the base plate 9, on which element the expansion element 7 is supported and displaces the mounting element 6, and with it the end surface 4', parallel to the coupling-in surface 4.

The exemplary coupling means according to FIGS. 1 and 2 operates passively, i.e., the displacement means 100 of this coupling means cannot be influenced or controlled externally. In preferred and advantageous embodiments of the inventive coupling means, the displacement means 100 can purposely be controlled externally by means of a control means designated 7' in the relevant figures, whereby the control means 7' preferably controls the expansion and/or contraction of the expansion element 7.

An embodiment, based on the embodiment according to FIGS. 1 and 2, of such a controllable construction is shown in FIG. 6 in simplified form, in a top view. The expansion element 7 of the displacement means 100 of this embodiment is made, as in the example according to FIGS. 1 and 2, of material with a thermal expansion coefficient α, and the control means 7' comprises a means for the controlled heating and/or cooling of the expansion element 7, which can for example comprise a resistance heating. Given expansion elements 7 made of electrically conductive materials, for example metals or semiconductor materials such as silicon, the heating current can flow directly through the part; otherwise, an additional resistance heating is attached to the expansion element 7.

In the embodiment according to FIGS. 1 and 2, the control means 7' according to FIG. 6 can additionally be provided, so that this example then operates in a compensating fashion, and is at the same time, and independent thereof, controllable externally.

In another controllable construction of the inventive coupling means FIG. 6, the expansion element 7 is made of piezoelectric material, and the control means 7' produces an electrical field strength E that can be changed in controlled fashion and that acts on the piezoelectric material.

An embodiment of this construction is shown in simplified fashion in FIG. 5, in a top view. The control means 7' consists of a voltage source for the production of a variable electric voltage V that is applied to the expansion element 7 and that can be adjusted externally.

The control means 7' according to FIG. 5 can also be expanded easily to form a compensation means 70, by providing a means 71 for determining the positional spacing Δx between the relative actual position x and relative target position x1 and a control means 7' for producing an electrical field strength E that acts on the piezoelectric material and that is proportional to the determined positional difference Δx in such a way that the piezoelectric expansion and/or contraction of the expansion element 7 produced by this field strength E essentially corresponds to the positional difference Δx.

The means 71 for determining the positional spacing Δx can for example be a temperature sensor that determines the positional spacing Δx from the temperature T in the vicinity of the coupling means, by sampling this temperature T and emitting to the control means 7' a signal that is essentially proportional to the sampled temperature T, on the basis of which signal the electrical field strength E adjacent to the piezoelectrical expansion element 7 is changed proportional to the temperature T in such a way that the relative target position x1 corresponding to the new temperature arises. In this embodiment, this compensation means 70 can operate in the manner of the compensation means 70 according to FIGS. 1 and 2 or according to FIG. 6, and is suited for temperature compensation e.g. of a filter according to the phased-array principle.

The means 71 for determining the positional spacing Δx can for example also be a wavelength scanner that determines the positional spacing Δx from a wavelength of the light that is produced by a light source and that is to be supplied to the coupling means, by sampling this wavelength and emitting to the control means 7' a signal that is essentially proportional to the sampled wavelength, on the basis of which the electrical field strength E adjacent to the piezoelectric expansion element 7 is changed proportional to the wavelength in such a way that the relative target position x1 corresponding to the new wavelength arises. In this embodiment, this compensation means 70 can be used for the compensation of wavelength alterations of light sources that are caused by temperature and/or ageing.

In the embodiment according to FIG. 5, the two types of compensation and the external controlling can be provided simultaneously and independent of one another.

In a further construction of the inventive coupling means, the displacement means 100 (FIG. 7) comprises a positioning motor 80, whereby in the case of a controllable construction the displacement means 100 comprises a positioning motor 80 controlled by the control means 7' for the displacement of the two end surfaces 4 and 4' relative to one another.

An embodiment of this construction is shown in simplified fashion in FIG. 7 in a top view. In this example, the positioning motor 80 is connected fixedly with the substrate 2 and/or with the base plate 9, and comprises for example a pinion 82 that engages in the teeth for example of a final actuating element 81 in the form of a toothed rack that is connected with the mounting element 6. A rotation of the pinion 82 causes a displacement of the toothed rack 81 and thereby of the mounting element 6 parallel to the edge 21 of the substrate 2 relative to the fixed positioning motor 80, so that the toothed rack 81, in relation to the fixed positioning motor 80, forms so to speak an expansion element corresponding to the expansion element 7.

The positioning motor 80 can be controlled externally and is controlled by a control means 7'. In addition, a means 71 can be provided for the determination of the positional difference Δx between the relative actual position x and the relative target position x1, and the control means 7' for controlling the positioning motor 80 dependent on the determined positional difference Δx can be fashioned in such a way that the positioning motor 80 essentially compensates the positional difference Δx. In this way, a compensation means 70 is realized.

With the embodiment according to FIG. 7, all functions of the example according to FIG. 5 can be realized in the same way.

The positioning motor 80 is preferably a stepped motor, and the positioning motor 80 and/or toothed rack 81 are preferably realized micromechanically.

Particularly in the above-specified embodiments, an inventive coupling means is suitable not only for the realization of a tunable filter according to the phased-array principle, but rather is advantageously generally suited for the realization of a tunable integrated-optical multi-channel filter with a coupling-in waveguide. For example, the optical filter can be an integrated optical multi-channel filter according to the spectrograph principle.

An example of such a filter is shown schematically in a top view in FIG. 11, and is designated 1'. This filter 1' comprises a layer waveguide 3' with a coupling-in end surface 4 for coupling light containing several wavelengths into the layer waveguide 3', a reflection grid 30' inserted into the waveguide 3', e.g. etched, for bending the coupled-in light conducted in the waveguide 3', and a coupling-out end surface 40 for coupling out the light bent by the grid 30' and conducted in the waveguide 3'. An optical multi-channel filter according to the spectrograph principle without an inventive coupling means is known from P. C. C. Clemens et al.: "Flat-Field-Spectrograph in SiO$_2$/Si", IEEE Photonics Technology Letters 4, page 886 (1992). The inventive coupling means can be combined with this known filter.

The grid 30' forms a coupling-in point i on the coupling-in end surface 4 onto a coupling-out point o1, o2, or, respectively, o3 (the number of coupling-out points is not limited to 3, but can be smaller or larger) on the coupling-out end surface 40 of the waveguide 3', whose position is wavelength-dependent. If the position of the coupling-in point i is displaced in relation to the coupling-in end surface 4, the position of the coupling-out points o1, o2, and o3 wanders corresponding to the optical imaging on the coupling-out end surface 40, so that here as well, similar to the filter 1 according to the phased-array principle, a fine tuning of the wavelength channels is possible via the position.

By means of the attachment of an inventive coupling means to the coupling-in end surface 4 and/or to the coupling-out end surface 40, a tunable filter according to the spectrograph principle can be made from the filter 1' according to FIG. 11.

In FIGS. 8 and 9, an embodiment of an optical attenuator realized with an inventive coupling means and an embodiment of an optical waveguide switch realized with an inventive coupling means are shown schematically in a top view.

In these embodiments, the waveguide end surfaces 4 and 4' positioned opposite one another are not, as in the coupling means according to FIGS. 1 to 7, the end surfaces of a layer waveguide 3 and strip-type waveguide 5, but rather are the end surfaces, positioned opposite one another, of strip-type optical waveguides 5 and 5' comprising essentially the same cross-section. For example, the strip-type waveguides 5 and 5' are optical fibers with the same diameter d.

In the attenuator according to FIG. 8, only the end surface 4 of one additional fiber 5' is arranged opposite the end surface 4' of the fiber 5.

In the waveguide switch according to FIG. 9, end surfaces 4, arranged alongside one another, of two additional fibers 5' are arranged opposite the end surface 4' of the fiber 5, and the displacement means is fashioned in such a way that the end surface 4' of the one fiber 5 and the end surfaces 4 of the other fibers 5' can be displaced relative to one another by at least a spacing a between the adjacent end surfaces 4 of the other fibers 5'.

Both in the attenuator and also in the waveguide switch, the other fibers 5' are for example mounted on a substrate 2, and an inventive coupling means with a displacement means 100 that can be controlled externally —for example a displacement means 100 with an expansion element 7 on which a mounting element 6 that holds the end surface 4' is fastened and that displaces the mounting element 6 in relation to a support point 8 that is fixed relative to the end surface or surfaces 4-serves for the displacement of the end surfaces 4 and 4' positioned opposite one another. The required control means for controlling the expansion and/or contraction of the expansion element 7 is not shown in FIGS. 8 and 9.

We claim:

1. An optical coupling device with two waveguide end surfaces, which are arranged opposite one another, for the coupling of light between the two end surfaces, one of the two end surfaces being an end surface of a waveguide of a phased-array filter in which the positions of the center wavelength is temperature-dependent, said device having displacement means for the displacement of the two end surfaces relative to one another in a direction parallel to the end surfaces, the means including an expansion element that moves the end surfaces relative to one another on the basis of a spatial expansion and/or contraction of the element and compensation means to compensate for a positional spacing between a relative actual position, which position of the two end surfaces assume relative to one another, and a relative target position, which target position the two end surfaces are supposed to assume relative to one another, the positional spacing between the relative actual position and relative target position being dependent on a change of temperature occurring in the environment of the coupling device, the compensation means being an expansion element of a material with a thermal expansion coefficient and the thermal expansion coefficient and a dimension of the expansion element parallel to the one end surface being selected so that a thermal expansion and contraction of the expansion element, caused by the temperature change, parallel to the one end surface essentially compensates for the positional spacing and to compensate for the temperature-dependance of the position of the center-wavelength of the phase-array filter.

2. Coupling device according to claim 1, wherein the expansion element expands and/or contracts in said direction parallel in relation to a support point that is fixed relative to one of the two end surfaces, and thereby moves the other end surface relative to the fixed support point.

3. Coupling device according to claim 2, wherein the other end surface is mounted in a mounting element that can be moved parallel to the one end surface, which mounting element is connected fixedly with the expansion element.

4. Coupling device according to claim 3, wherein the mounting element and the expansion element are fashioned in one piece.

5. Coupling device according to claim 3, wherein the mounting element is of one piece and comprises a continuous opening in which a waveguide comprising the other end surface is received and is fixed.

6. A coupling device according to claim 3, which includes guide means for the linear guiding of the mounting element parallel to the one end surface.

7. Coupling device according to claim 6, wherein the guide means comprises two glide surfaces that are positioned opposite one another and are arranged fixedly relative to the one end surface, between which glide surfaces the mounting element is arranged and along which the mounting element can be displaced parallel to the one end surface.

8. Coupling device according to claims 1, wherein the displacement means includes a control means with which the expansion and/or contraction of the expansion element can be controlled.

9. Coupling device according to claim 8, wherein the control means comprises means for the controlled heating and/or cooling of the expansion element.

10. A coupling device according to claim 1, which includes at least one additional waveguide being arranged alongside one of the two waveguides at a fixed spacing, the displacement means displacing the other of the two waveguides at a distance at least equal to said fixed spacing, and said displacement means including control means for controlling said displacement means so that the other of the two waveguides can be switched between a position aligned with the one waveguide and the at least additional waveguide.

11. A coupling device according to claim 10, wherein the waveguides are stripped waveguides of essentially the same cross-section.

* * * * *